United States Patent
Auman et al.

[11] 3,853,334
[45] Dec. 10, 1974

[54] OCCUPANT RESTRAINT SYSTEM
[75] Inventors: John T. Auman, Washington; Robert L. Hodgson, Warren, both of Mich.
[73] Assignee: General Motors Corporation, Detroit, Mich.
[22] Filed: Dec. 11, 1972
[21] Appl. No.: 314,120

[52] U.S. Cl............. 280/150 AB, 9/314, 280/87 R
[51] Int. Cl.......................................... B60n 21/08
[58] Field of Search................. 280/150 AB; 9/314

[56] References Cited
UNITED STATES PATENTS

| | | | |
|---|---|---|---|
| 3,309,109 | 3/1967 | Baughman | 280/150 B |
| 3,588,142 | 6/1971 | Gorman | 280/150 AB |
| 3,632,136 | 1/1972 | Foltz | 280/150 AB |
| 3,643,971 | 2/1972 | Kushnick | 280/150 AB |
| 3,666,289 | 5/1972 | Magyar | 280/150 AB |
| 3,723,205 | 3/1973 | Scheffee | 280/150 AB |
| 3,764,160 | 10/1973 | Fiala | 280/150 AB |

Primary Examiner—David Schonberg
Assistant Examiner—John P. Silverstrim
Attorney, Agent, or Firm—Herbert Furman

[57] ABSTRACT

An occupant restraint system for the driver of a vehicle includes an open housing mounted on the hub of the steering wheel and communicating with a pressure vessel containing fluid under pressure. A plurality of discrete members of foam material are compressed into a mass within the housing. The opening of the housing is closed by a pressure rupturable membrane to hold the compressed mass in place. A cushion is secured to the housing and folded over the membrane in communication with the opening of the housing. A decorative cover covers the cushion. When the pressure fluid is released to the housing, the increase in pressure ruptures the membrane. The fluid initially inflates the cushion as the decorative cover ruptures along predetermined lines. The members expand to substantially the uncompressed volume thereof by absorption of the fluid as the members flow into the cushion and fill the cushion.

3 Claims, 3 Drawing Figures

PATENTED DEC 10 1974  3,853,334

OCCUPANT RESTRAINT SYSTEM

This invention relates to an occupant restraint system for a vehicle and more particularly to such a system wherein an occupant restraint is inflated both by fluid and by an expanded mass of compressed foam material.

It is well known in the art to effect inflation of an occupant restraint by pressure fluid. The pressure fluid source may be a pressure vessel, a gas generator, or a hybrid type unit.

The restraint system of this invention differs in that a fluid source and an expanded mass of normally compressed foam material cooperatively inflate the occupant restraint. In the preferred embodiment, the mass of compressed foam material comprises a plurality of discrete members or blocks of suitable foam material, such as polyurethane foams or cellulose sponge having a free volume of approximately twice that of the restraint. These members are tightly compressed within an open housing. The opening of the housing is closed by a pressure rupturable membrane. A folded expandable occupant restraint covers the membrane and communicates with the housing opening. The source of pressure fluid communicates with the housing and when energized in a conventional manner, such as by impact or velocity responsive sensors, the resultant increase in pressure within the housing ruptures the membrane to effect initial inflation of the restraint by the fluid and to release the mass of members for expansion thereof by absorption of the fluid and flow to the restraint. A suitable decorative cover having predetermined tear lines covers the restraint. The assembly normally functions as an energy absorber since the compressed mass of foam material has an energy absorbing capability. The system functions to absorb the energy of impact forces due to occupant impact engagement therewith both in its normal unactuated condition wherein the members are in a compressed mass, and in its actuated condition, wherein the members maintain the occupant restraint in a filled condition for operation thereof under multiple impact conditions caused by multiple crash events.

The primary feature of this invention is that it provides an improved occupant restraint system which includes an occupant restraint which is inflated by the cooperative action of fluid and an expanded mass of compressed foam material. Another feature of this invention is that the mass of foam material comprises a plurality of discrete members or blocks of foam material which are normally compressed and encapsulated, with the fluid effecting initial inflation of the restraint and the expansion of the members and the flow thereof to the restraint when the members are released from their compressed state. A further feature of this invention is that the pressure fluid effects release of the members by rupturing a pressure rupturable member normally holding the compressed mass within an enclosure. Yet another feature of this invention is that the restraint and the mass of foam material, either compressed or expanded, have the capability of absorbing the energy of impact forces generated by multiple occupant engagement therewith.

These and other features of the invention will be readily apparent from the following specification and drawings wherein.

Figure 1:
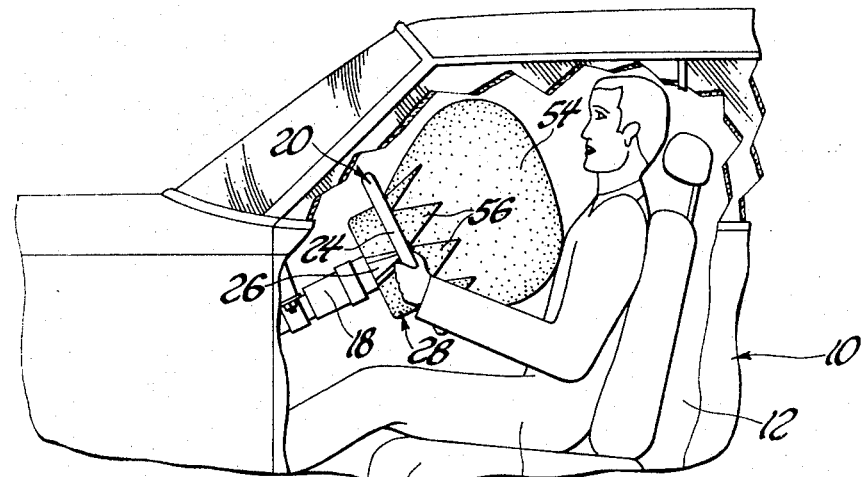
FIG. 1 is a view of an automotive vehicle embodying an occupant restraint system according to this invention, with the occupant restraint being shown in an expanded condition.

Referring now particularly to FIG. 1 of the drawings, an automotive vehicle designated generally 10 includes an occupant compartment 12 having a conventional front seat 14 for supporting a driver 16 in seated attitude. A steering column assembly 18 of the energy absorbing type is conventionally mounted on the vehicle 10 and mounts a steering wheel 20 at its rearward or upper end for use by the driver 16.

Figure 2:
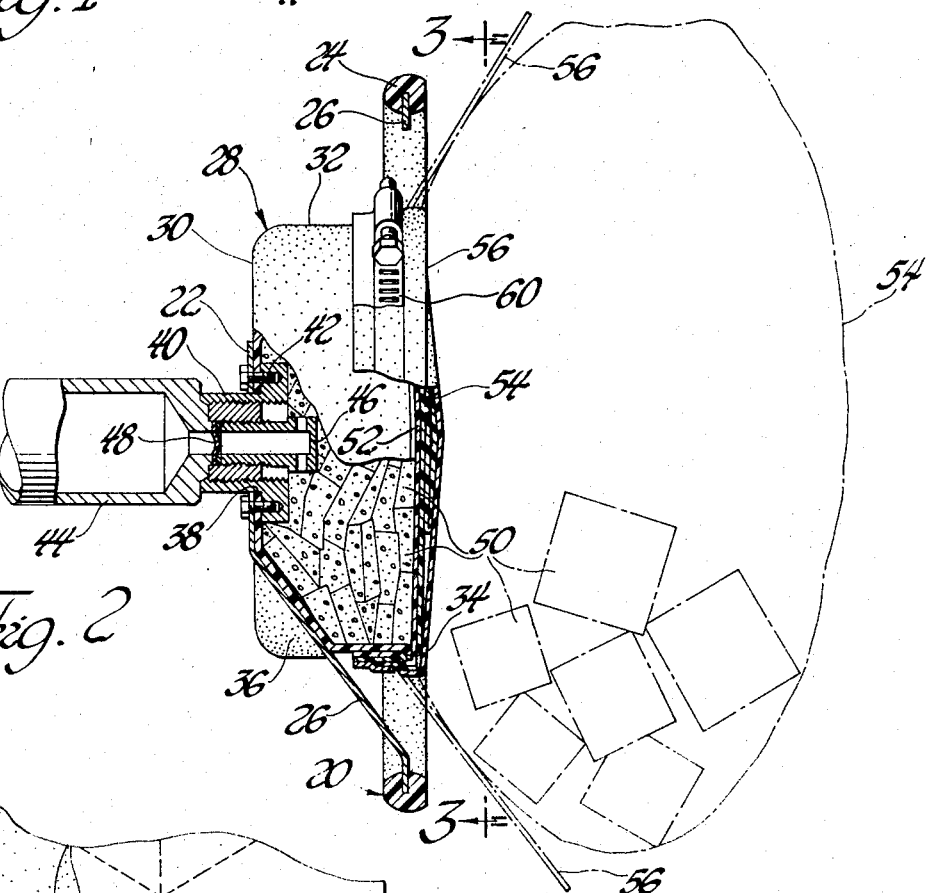
FIG. 2 is a view similar to FIG. 1 showing the restraint in its normal condition in full lines and showing the restraint in expanded condition in dash lines.

The steering wheel 20, as shown in FIGS. 1 and 2, is of a conventional three-spoke design and includes a circular hub 22, a rim 24 and three generally equally spaced spokes 26 formed integrally with the hub and supporting the rim thereon. A generally circular open walled enclosure or housing 28 of semi-rigid plastic includes a base wall 30 which seats on the hub 22 and a circular sidewall 32 which extends from the base wall toward the driver and has a terminal lip flange 34 defining the opening of the housing. The base wall 30 and the sidewall 32 are provided with three equally spaced angularly extending walled grooves or indentations 36 which receive the spokes 26 to permit the base wall 30 to seat on the hub 22. As shown in FIG. 2, the hub 22 and the base wall 30 are provided with aligned circular openings 38 which receive the internally threaded shank of an internally threaded headed bushing 40. Suitable fasteners 42 extend through openings in the hub 22 and the base wall 30 into tapped apertures of the head of the bushing to secure the housing to the hub 22 of the steering wheel. The externally threaded outlet of a conventional pressure vessel 44 is received within the bushing to mount the pressure vessel to the steering wheel. The pressure vessel contains air or nitrogen under pressure. A threaded hollow outlet member 46 of the pressure vessel extends within the housing 28 and opens thereto through radial ports. The outlet member is threaded into the pressure vessel outlet and communicates with the pressure vessel across a pressure rupturable diaphragm 48.

Figure 3:
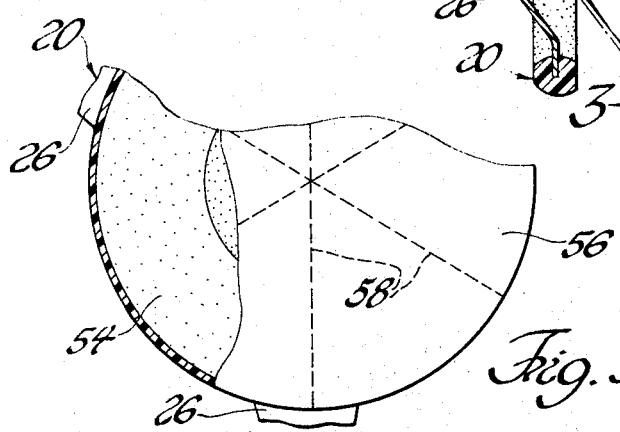
FIG. 3 is a sectional view taken generally along the plane indicated by line 3—3 of FIG. 2.

The housing 28 is filled with a mass of compressed blocks or discrete members 50 of foam material. Suitable foam materials are the polyurethane foams and cellulose sponge. Such materials can be tightly compressed in high linear ratios, such as 40 to 1, from their normal uncompressed state to a compressed state. A membrane 52 of pressure rupturable material, such as Mylar, covers the opening of the housing 28 and overlaps the flange 34 and the adjacent exterior portion of the wall 32. An expandable occupant restraint cushion 54 of generally mushroom shape has an open end portion overlapping the portion of the membrane extending along the wall 32. The remainder of the cushion is suitably pleated or folded, as shown, over the membrane 52. The volume of the cushion is approximately half that of the expanded volume of the members 50. An outer decorative cover 56 having predetermined tear lines 58, FIG. 3, covers the folded cushion and has an end portion overlapping the open end portion of the cushion 54. The overlapping portions of the membrane, the cushion and the cover are tightly clamped to the wall 32 in a conventional manner, such as by a worm clamp 60 whereby the membrane 52 holds the compressed members 50 within the housing 28, and the cover 56 holds the cushion 54 in its folded condition over the membrane. When the system is in its unactuated condition shown in full lines in FIG. 2, the cover, cushion, and membrane can transmit the energy of impact forces resulting from occupant engagement with the cover to the compressed mass of members 50. Such members do have a limited energy absorbing capability even when compressed so that the system of this system can function as an energy absorber for absorbing impact forces even when the system is in its unactuated condition.

The pressure vessel 44 is connected to a suitable control system which includes various conventional means of sensing actual or impending engagement of the vehicle 10 with an obstacle. Upon the occurrence of such an event, the diaphragm 48 of the pressure vessel is conventionally ruptured and the pressurized fluid within the pressure vessel flows through the radial ports of the outlet member 46 into the interior of the housing 28. When the fluid flows into the housing, the rapid increase in pressure easily ruptures the membrane 52. The compressed members 50 are now released for expansion by and flow with the fluid into the cushion 54. The fluid effects the initial inflation of the cushion and the continued flow of the fluid effects the expansion of the members 50 and the flow of the expanded members to the cushion to substantially fill the cushion. The tear lines 58 separate the cover 56 into sector shaped fragments as shown in full lines in FIG. 1 and in dash lines in FIG. 2.

When the cushion 54 is inflated and filled with the members 50, it will be located in its position shown in full lines in FIG. 1 and in dash lines in FIG. 2. When the driver 16 initially engages the cushion, the cushion will collapse as the fluid is expelled and the foam members are compressed. The kinetic energy of movement of the occupant will be absorbed by the combined action of the expulsion of the fluid from within the cushion, in various conventional manners, and the compression of the expanded members 50. After the initial impact engagement, the cushion 54 would normally be deflated due to the expulsion of the fluid from the cushion in various conventional and known manners. However, since the cushion 54 is substantially filled with the expanded members 50, these members will return the cushion to substantially the same initial inflated and filled position as the members again expand. Thus, the cushion can function for succeeding impact situations which result from multiple crash events.

Tests have shown that a 1.75 cubic foot cushion can be inflated in less than thirty milliseconds through use of a pressure vessel of from less than ½ to 1 cubic foot size and containing nitrogen under pressure of from 800 to 1,000 psi. The housing 28 was filled with a mass of foam material which in its free state would have a volume of approximately twice that of the cushion 54. The tests were run with approximately two inch cubes of polyurethane foams. Additional tests have shown that once the cushion 54 is filled with the foam members, the cushion functioned adequately in multiple impact situations.

The herein-described embodiment maintains the compressed blocks or discrete members of foam material within the housing solely due to the membrane 52 which covers the housing 28. However, it should be noted that it is possible to place the members 50 within a sealed flexible container, such as one of plastic, compress the members and the container by the use of vacuum, place the container within the housing, and communicate it directly with the outlet member 46. The membrane 52 would therefore not be necessary. It should also be noted that while a single block of foam material, or a few large blocks may be used, a plurality of discrete members or blocks of foam material expand in less time due to the greater breathing surface area of such members as compared to that of the single block of foam material or the few large blocks of foam material.

Although the occupant restraint system has been described in conjunction with an inflatable cushion mounted on a steering wheel for use by the driver, it should be noted that the invention is equally applicable to other inflatable type restraints mounted on other portions of a vehicle, such as on pillars, seats, instrument panels, and sun visors. Additionally, although the inflation of the cushion has been described in a step relationship, in other words, the inflation of the cushion is initially effected by the pressure fluid and the cushion is thereafter filled by the flow of the expanded members into the cushion, it should be noted that the entire inflation sequence takes place in thirty milliseconds. Accordingly, the flow of expanded members to the cushion occurs after the cushion is initially inflated but before it is fully inflated if the time budget is to be met.

Thus, this invention provides an improved occupant restraint system.

We claim:

1. An occupant restraint system for a vehicle comprising, in combination, encapsulating means mounted on the vehicle and including a rupturable outlet, a compressed mass of foam material within the encapsulating means, an expandable occupant restraint communicable with the encapsulating means through the rupturable outlet, a source of fluid for interacting with the mass of foam material to expand the foam material to substantially the uncompressed volume thereof by absorption of the fluid when the mass of foam material is released from the encapsulating means, means communicating the source with the encapsulating means, and means for rupturing the rupturable outlet upon communication of the source with the encapsulating means to release the mass of foam material for expansion by absorption of the fluid and for flow with the fluid to the restraint, the fluid and the expanded foam material within the restraint cooperatively absorbing the energy of impact forces upon occupant engagement with the restraint.

2. An occupant restraint system for a vehicle comprising, in combination, encapsulating means mounted on the vehicle and including a rupturable outlet, a plurality of discrete members of foam material compressed within the encapsulating means, an expandable occupant restraint communicable with the encapsulating means through the rupturable outlet, a source of fluid for interacting with the discrete members of foam material to expand the foam material members to substantially the uncompressed volume thereof by absorption of the fluid when the members of foam material are released from the encapsulating means, means communicating the source with the encapsulating means, and means for rupturing the rupturable outlet upon communication of the source with the encapsulating means to release the members of foam material for expansion by absorption of the fluid and for flow with the fluid to the restraint, the fluid and the expanded members of foam material within the restraint cooperatively absorbing the energy of impact forces upon occupant engagement with the restraint.

3. An occupant restraint system for a vehicle comprising, in combination, encapsulating means mounted on the vehicle and including a flexible rupturable outlet, a compressed mass of foam material within the encapsulating means, an expandable occupant restraint overlying, at least, a portion of the flexible outlet and cooperating therewith and with the compressed mass of foam material to provide an energy absorber, a source of fluid for interacting with the mass of foam material to expand the foam material to substantially the uncompressed volume thereof by absorption of the fluid when the mass of foam material is released from the encapsulating means, means communicating the source with the encapsulating means, and means for rupturing the outlet upon communication of the source with the encapsulating means to release the mass of foam material for expansion by absorption of the fluid and for flow with the fluid to the restraint, the fluid and the expanded foam material within the restraint cooperatively absorbing the energy of impact forces upon occupant engagement with the restraint.

\* \* \* \* \*